(12) United States Patent
Kim et al.

(10) Patent No.: US 10,739,898 B2
(45) Date of Patent: Aug. 11, 2020

(54) ELECTRONIC DEVICE AND OPERATION METHOD THEREFOR

(71) Applicant: Samsung Electronics Co., Ltd., Gyeonggi-do (KR)

(72) Inventors: Daemyung Kim, Gyeonggi-do (KR); Daehyun Kim, Gyeonggi-do (KR); Ilho Lee, Gyeonggi-do (KR); Yong-Jin Choi, Seoul (KR); Shiyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/340,014

(22) PCT Filed: Sep. 21, 2017

(86) PCT No.: PCT/KR2017/010381
§ 371 (c)(1),
(2) Date: May 23, 2019

(87) PCT Pub. No.: WO2018/066843
PCT Pub. Date: Apr. 12, 2018

(65) Prior Publication Data
US 2019/0286273 A1    Sep. 19, 2019

(30) Foreign Application Priority Data

Oct. 5, 2016    (KR) .................. 10-2016-0128329

(51) Int. Cl.
*G06F 3/041* (2006.01)
*G06F 1/16* (2006.01)
(Continued)

(52) U.S. Cl.
CPC .......... *G06F 3/0414* (2013.01); *G06F 1/1626* (2013.01); *G06F 1/1652* (2013.01);
(Continued)

(58) Field of Classification Search
CPC .............. G06F 3/041–3/048; G06F 2203/00–2203/04809; G06F 3/0414;
(Continued)

(56) References Cited

U.S. PATENT DOCUMENTS

2006/0293864 A1    12/2006   Soss
2007/0052690 A1     3/2007   Roberts
(Continued)

FOREIGN PATENT DOCUMENTS

JP    2007108441     4/2007
KR    20130073621    7/2013
(Continued)

OTHER PUBLICATIONS

PCT/ISA/210 Search Report issued on PCT/KR2017/010381 (pp. 5).
PCT/ISA/237 Written Opinion issued on PCT/KR2017/010381 (pp. 6).

*Primary Examiner* — Sanjiv D. Patel
(74) *Attorney, Agent, or Firm* — The Farrell Law Firm, P.C.

(57) ABSTRACT

The present invention relates to an electronic device and an operation method therefor. The electronic device comprises a sensor and a processor. The processor can be configured to detect, through the sensor, bending of the electronic device, detect, through the sensor, bending pressure generated by the bending of the electronic device, and compensate for the intensity of the pressure input detected by the sensor on the basis of the intensity of the bending pressure. Other embodiments are also possible.

20 Claims, 19 Drawing Sheets

(51) Int. Cl.
*G09G 5/00* (2006.01)
*G09G 5/38* (2006.01)
*G06F 3/0487* (2013.01)

(52) U.S. Cl.
CPC ............ *G06F 3/041* (2013.01); *G06F 3/0416* (2013.01); *G06F 3/0487* (2013.01); *G09G 5/003* (2013.01); *G09G 5/38* (2013.01); *G06F 2203/04102* (2013.01); *G06F 2203/04105* (2013.01); *G09G 2354/00* (2013.01); *G09G 2380/02* (2013.01)

(58) Field of Classification Search
CPC . G06F 2203/04105; G06F 2203/04102; G06F 3/045; G06F 1/1652; G06F 3/04144
See application file for complete search history.

(56) References Cited

U.S. PATENT DOCUMENTS

| | | |
|---|---|---|
| 2007/0085845 A1 | 4/2007 | Kikuchi et al. |
| 2007/0205997 A1 | 9/2007 | Lieshout et al. |
| 2011/0050586 A1 | 3/2011 | Miller et al. |
| 2013/0162556 A1 | 6/2013 | Yu |
| 2014/0004906 A1 | 1/2014 | Chi et al. |

FOREIGN PATENT DOCUMENTS

| | | |
|---|---|---|
| KR | 20140046178 | 4/2014 |
| KR | 101581275 | 12/2015 |

ELECTRONIC DEVICE AND OPERATION METHOD THEREFOR

PRIORITY

This application is a National Phase Entry of International Application No. PCT/KR2017/010381, which was filed on Sep. 21, 2017, and claims priority to Korean Patent Application No. 10-2016-0128329, which was filed on Oct. 5, 2016, the content of each of which are incorporated herein by reference.

BACKGROUND

1. Field of the Disclosure

Various embodiments of the disclosure relate to an electronic device and an operation method therefor.

2. Description of the Related Art

As the use of multimedia services using electronic devices increases, information quantitation having to be processed in the electronic device and information quantitation having to be displayed are increasing. Accordingly to this, attention is being increasingly paid to an electronic device with a touch screen capable of improving a space utilization to increase a size of a display unit.

A touch screen can perform information input and display in one screen. For example, through the touch screen, an electronic device can sense a user's touch input. Accordingly to this, while performing a control command of the touch input, the electronic device can display a control command execution result on the touch screen.

Further, the electronic device can be implemented in a bendable type (or foldable type) as well.

SUMMARY

An electronic device implemented in a bendable type can be bent in a specific region serving as a boundary, but due to a bent construction (e.g., a display), an external pressure can be applied to at least part of a sensor disposed in the electronic device. That is, in a state in which bending is generated, the electronic device can sense a pressure of a constant level intensity through at least part of the sensor, even if a pressure input is directly not generated. Accordingly to this, the electronic device can recognize a pressure input of an intensity greater than a pressure input a user intends, thus making it difficult to perform a function the user intends.

An electronic device and method of various embodiments of the disclosure can compensate the intensity of a pressure input correspondingly to sensing of a bending pressure, thereby performing a function corresponding to a pressure input that the user intends.

An electronic device and method of various embodiments of the disclosure can process correspondingly to sensing of a bending pressure, wherein display information being present in a bending region is displayed outside the bending region.

An electronic device according to various embodiments of the disclosure may include a sensor and a processor. The processor may be configured to sense bending of the electronic device through the sensor, sense a bending pressure provided by the bending of the electronic device through the sensor, and compensate the intensity of a pressure input sensed through the sensor on the basis of the intensity of the bending pressure.

An operation method of an electronic device according to various embodiments of the disclosure may include sensing bending of the electronic device through a sensor, sensing a bending pressure provided by the bending of the electronic device through the sensor, and compensating the intensity of a pressure input sensed through the sensor on the basis of the intensity of the bending pressure.

A computer-readable recording medium according to various embodiments of the disclosure may store a program for executing sensing bending of the electronic device through a sensor, sensing a bending pressure provided by the bending of the electronic device through the sensor, and compensating the intensity of a pressure input sensed through the sensor on the basis of the intensity of the bending pressure.

An electronic device and an operation method therefor of various embodiments of the disclosure can perform a function corresponding to a pressure input a user intends, by compensating sensor information wherein an additional pressure input sensed in a region where a bending pressure is provided is recognized as a pressure input sensed in a state in which the bending pressure is not provided. Also, the electronic device and operation method therefor of the various embodiments of the disclosure can process wherein display information being present in a bending region is displayed outside the bending region, thereby preventing a pressure input the user does not intend from being sensed due to a bending pressure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
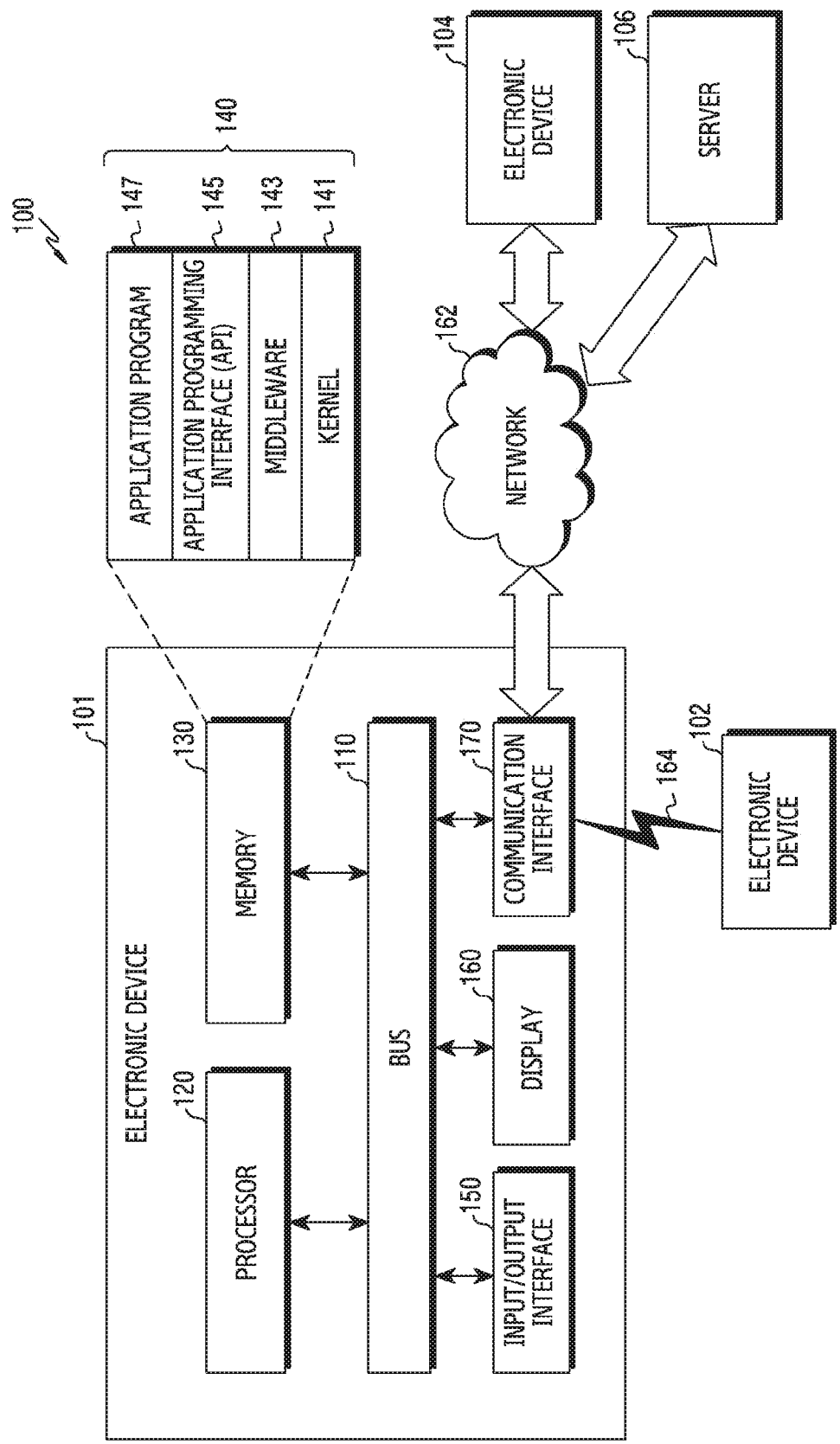
FIG. 1 is a diagram illustrating an electronic device within a network environment according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices.

In the present document, the term 'user' may denote a person who uses the electronic device or a device (e.g., an artificial-intelligent electronic device) which uses the electronic device.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101.

According to an embodiment, the processor 120 may identify whether a pressure (e.g., a bending pressure) caused by bending of the electronic device 101 is provided in at least part of a pressure sensor. For instance, the bending may include at least one of a bending and hold operation of holding the electronic device 101 in a bent state, a twist operation of twisting the electronic device 101, a folding operation of folding at least part of the electronic device 101, a rolling operation of rolling the electronic device 101 in at least one direction, etc.

According to an embodiment, in response to sensing providing of a bending pressure, the processor 120 may compensate a pressure input sensed in a region where the bending pressure is sensed, to control a function of the electronic device 101. For example, the processor 120 may process (e.g., compensate) wherein at least part of the bending pressure is eliminated from pressure information (e.g., pressure intensity) received from a pressure sensor (or a pressure IC). The processor 120 may control a function of the electronic device 101 corresponding to the compensated pressure information. For another example, the processor 120 may control at least one sensor (e.g., the pressure sensor) wherein at least part of the bending pressure is eliminated from pressure information. Also, the processor 120 may receive, from the sensor, the pressure information (e.g., compensated pressure information) from which at least part of the bending pressure is eliminated, and control a function of the electronic device 101 corresponding to the received pressure information.

According to an embodiment, in response to sensing providing of a bending pressure, the processor 210 may process to control the display 160, wherein display information is displayed in a region where the bending pressure is not sensed.

The memory 130 may include a volatile and/or nonvolatile memory. The memory 130 may, for example, store a command or data related to at least one another constituent element of the electronic device 101.

According to an embodiment, the memory 130 may store a reference input value for identifying conditions capable of sensing a pressure input.

According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS).

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body. According to one embodiment, the display 160 may include a pressure panel and may receive a pressure inputted by part of the user's body or a nonconductor.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106). The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
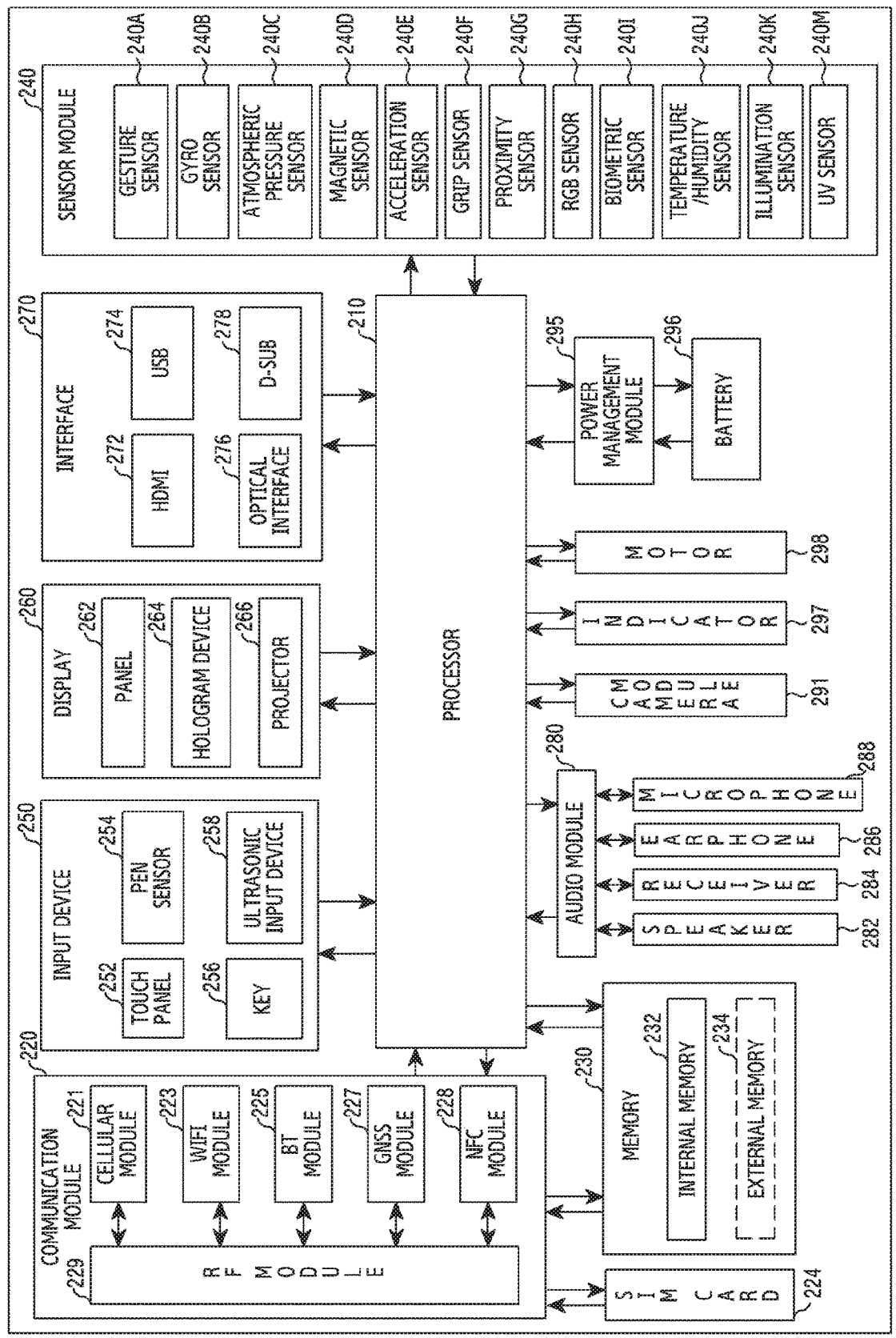
FIG. 2 is a block diagram of an electronic device according to various embodiments of the disclosure.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, a display driver interface (DDI) 268, and/or a control circuit for controlling them. The panel 262 may, for example, be implemented to be flexible, transparent, or wearable. The panel 262 may be constructed as one or more modules together with the touch panel 252. The panel 262 may include a pressure sensor which may measure the strength of pressure of a user's touch. The pressure sensor may be implemented so as to be integrated with the touch panel 252 or may be implemented as one or more sensors separate from the touch panel 252.

The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature.

The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
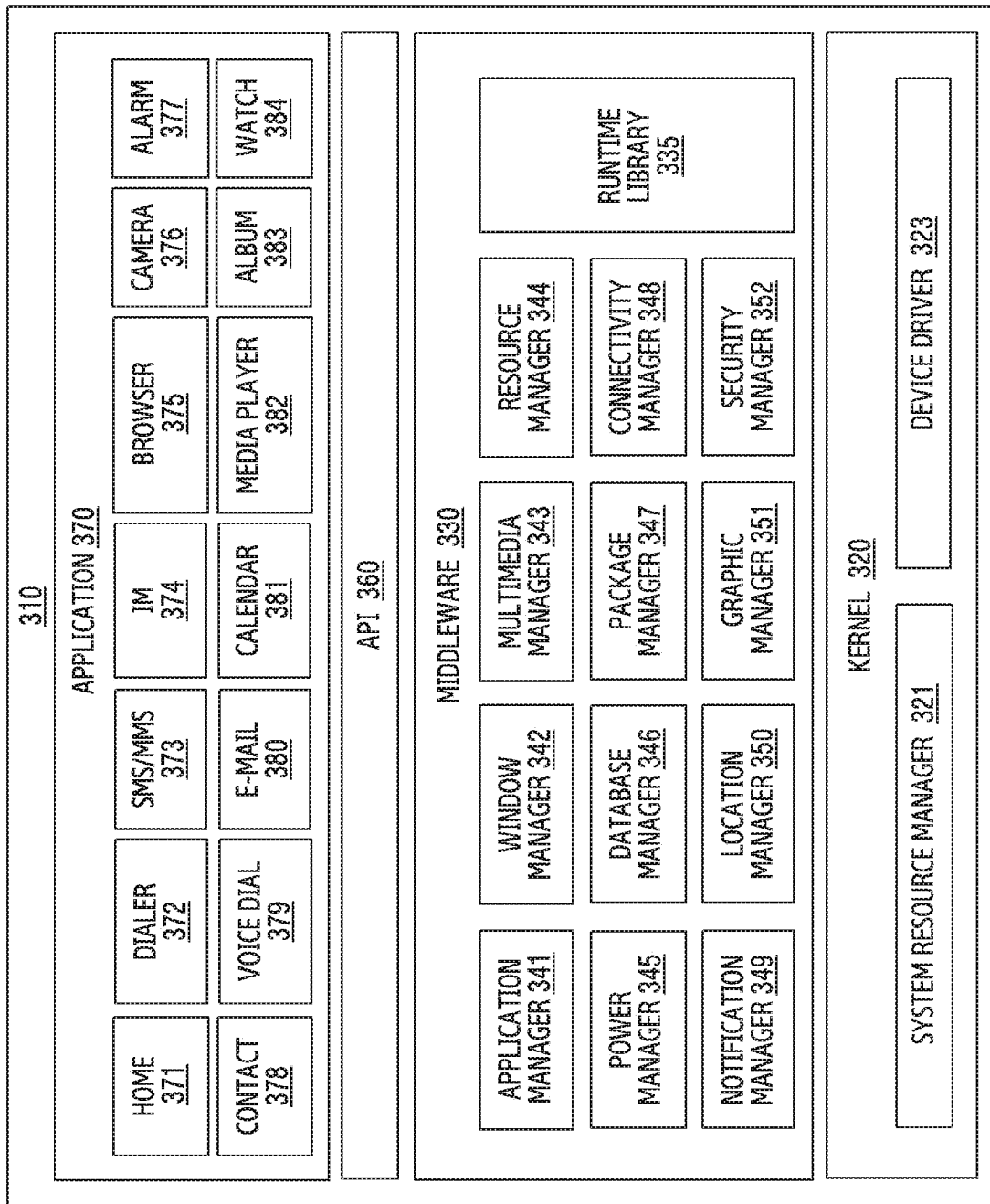
FIG. 3 is a block diagram of a program module according to various embodiments of the disclosure.

FIG. 3 illustrates a block diagram of a program module according to various embodiments. According to an embodiment, the program module 310 (e.g., the program 140) may include an operating system (OS) controlling resources related to an electronic device (e.g., the electronic device 101) and/or various applications (e.g., the application program 147) run on the operating system. The operating system may, for example, include Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323. The system resource manager 321 may perform control of a system resource, allocation thereof, or recovery thereof. According to an embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, or an inter-process communication (IPC) driver.

The middleware 330 may, for example, provide a function that the application 370 needs in common, or provide various functions to the application 370 through the API 360 wherein the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may obtain a format used for playing media files, and perform encoding or decoding of the media file by using a codec suitable to the corresponding format. The resource manager 344 may manage a source code of the application 370 or a space of a memory. The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS). The database manager 346 may, for example, provide, search or change a database that will be used in the application 370. The package manager 347 may manage the installing or refining of an application that is distributed in the form of a package file. The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to the user, or a user interface related with this. The security manager 352 may, for example, provide system security or user authentication.

According to an embodiment, the middleware 330 may include a telephony manager for managing a voice or video call function of the electronic device, or a middleware module capable of forming a combination of functions of the aforementioned constituent elements. According to an embodiment, the middleware 330 may provide a module that is specialized by type of an operating system. The middleware 330 may dynamically delete some of the existing constituent elements, or add new constituent elements.

The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device. For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device. According to an embodiment, the application 370 may include an application (e.g., a health care application of a mobile medical instrument) designated according to properties of the external electronic device. According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA) or a programmable logic device, which has been known or will be developed in future, performing some operations. At least a part of an apparatus (e.g., modules or functions thereof) or method (e.g., operations) according to various embodiments may, for example, be implemented as an instruction which is stored in a computer-readable storage medium (e.g., the memory 130) in the form of a program module. In response to the instruction being executed by a processor (e.g., the processor 120 of FIG. 1 or the processor 210 of FIG. 2), the processor may perform a function corresponding to the instruction. The computer-readable recording medium may include a hard disk, a floppy disk, a magnetic medium (e.g., a magnetic tape), an optical recording medium (e.g., a compact disk-read only memory (CD-ROM), a digital versatile disk (DVD)), a magneto-optical medium (e.g., a floptical disk), an internal memory, etc. The instruction may include a code which is made by a compiler or a code which is executable by an interpreter. The module or program module according to various embodiments may include at least one or more of the aforementioned constituent elements, or omit some of them, or further include another constituent element. Operations carried out by the module, the program module or the another constituent element according to various embodiments may be executed in a sequential, parallel, repeated or heuristic manner, or at least some operations may be executed in different order or may be omitted, or another operation may be added.

Figure 4A:
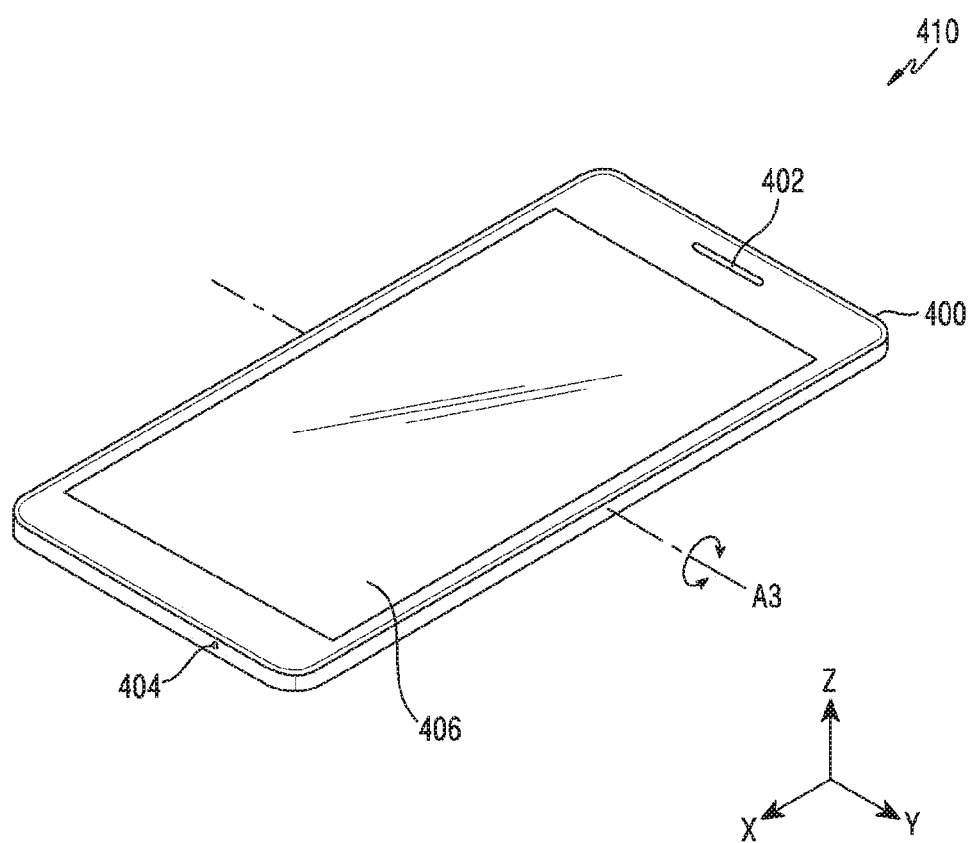
FIG. 4A and FIG. 4B are diagrams illustrating a bendable type electronic device including a flexible display according to various embodiments of the disclosure.
Figure 4B:
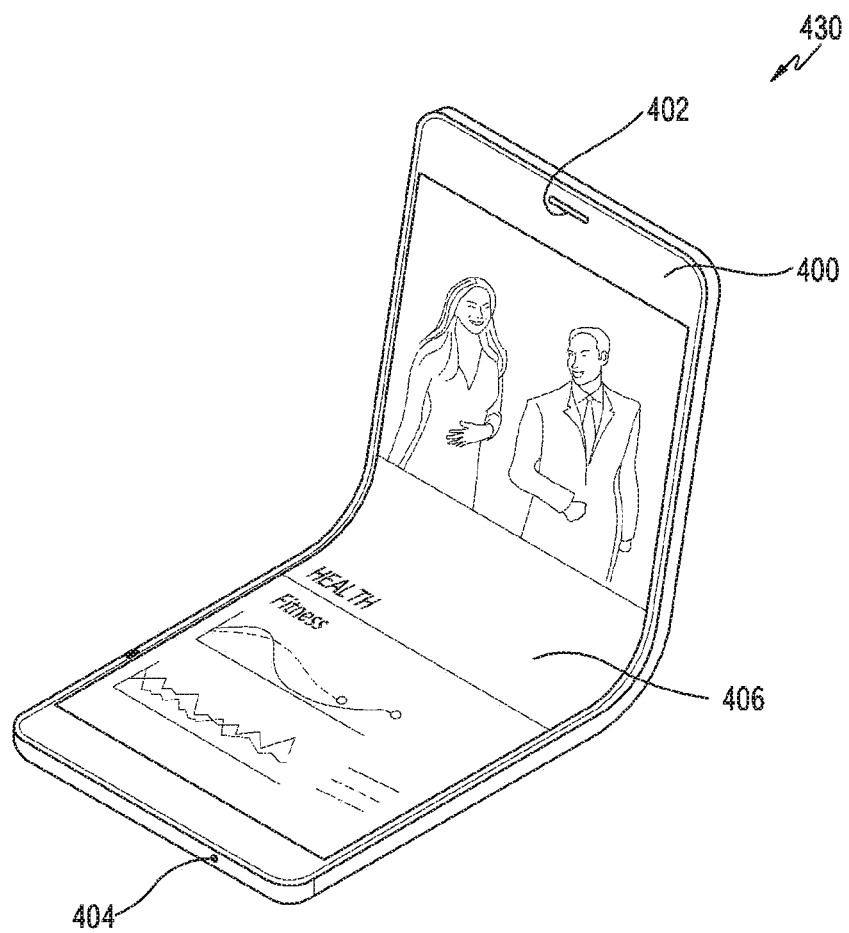

FIG. 4A and FIG. 4B are diagrams illustrating a bendable type electronic device 400 including a flexible display according to various embodiments of the disclosure.

As in 410 of FIG. 4A, the electronic device 400 (e.g., the electronic device 101) may consist of one body. For example, the electronic device 400 may be a communicating electronic device which includes a speaker device 402 and a microphone device 404. According to an embodiment, the electronic device 400 may include a flexible display 406. For example, as in 430 of FIG. 4B, the electronic device 400 may be bent at at least one axis (e.g., generally a center portion) A3 serving as a rotation axis. In response to being bent, a display region of the display 406 may be divided into a first region and a second region with a criterion of the axis A3.

Figure 5:
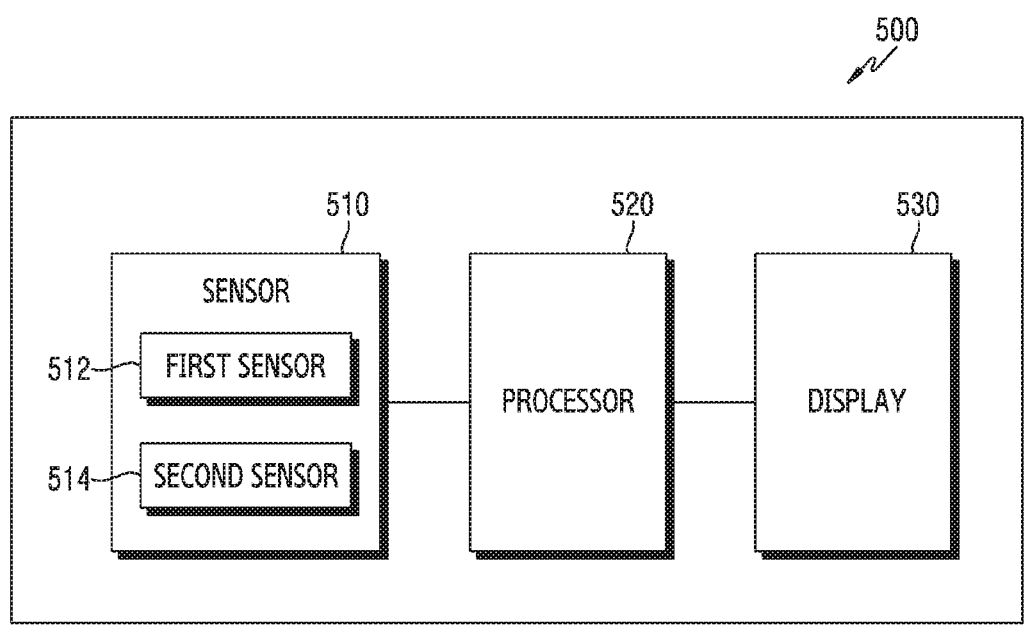
FIG. 5 is a block diagram for explaining an electronic device 500 according to various embodiments of the disclosure.

FIG. 5 is a block diagram for explaining an electronic device 500 according to various embodiments of the disclosure. According to an embodiment, the electronic device 500 may include the entire or part of the electronic device 101 or the electronic device 201.

Referring to FIG. 5, the electronic device 500 may include a sensor 510, a processor 520, and a display 530.

According to an embodiment, the sensor 510 may include at least one first sensor 512 for recognizing a bent state, bending angle, etc. of the electronic device 500 and at least one second sensor 514 for sensing an input (e.g., a user input) for controlling an operation of the electronic device 500.

According to an embodiment, the first sensor 512 may collect sensor information corresponding to a form of the electronic device 500 which is deformed by physical force. In response to collecting the sensor information associated with the bent state, the bending angle, etc., the first sensor 512 may provide the collected sensor information to the processor 520. For example, the first sensor 512 may be a bending sensor capable of being bent by physical force and capable of collecting the sensor information corresponding to a bending degree. For another example, the first sensor 512 may include a sensor capable of sensing a state of at least part of the electronic device 500. For instance, the first sensor 512 may include at least any one of a gesture sensor, a gyro sensor, a magnetic sensor, an acceleration sensor, a proximity sensor, and/or an illuminance sensor.

According to an embodiment, the second sensor 514 may collect sensor information (e.g., a coordinate of a pressure input, the intensity of the pressure input, etc.) associated with a pressure input controlling an operation of the electronic device 500. For example, the second sensor 514 may include at least one of a touch sensor and a pressure sensor. In response to collecting the sensor information associated with the pressure, the second sensor 514 may provide the collected sensor information to the processor 520. Also, the second sensor 514 may compensate sensor information collected in a state in which a bending pressure is provided, by using a specific compensation value, to provide to the processor 520 as well. For example, the second sensor 514 may compensate the sensor information wherein the sensor information corresponds to sensor information which is sensed in conditions in which a bending pressure is not provided. For instance, the second sensor 514 may process wherein the sensor information is compensated by controlling a reference variable (e.g., an obtaining sensitivity) for obtaining a pressure input on the basis of the bending pressure.

According to an embodiment, the processor 520 may identify whether a bending pressure is sensed, on the basis of sensor information collected from the at least one first sensor 512 and second sensor 514. For instance, the bending pressure may be a pressure which is applied, by a bending motion, to at least part (e.g., at least some pixels of the second sensor 514) of the second sensor (e.g., the pressure sensor) 514. Also, the bending may include at least one of a bending and hold operation of holding the electronic device 500 in a bent state, a twist operation of twisting the electronic device 500, a folding operation of folding at least part of the electronic device 500, a rolling operation of rolling the electronic device 500 in at least one direction, etc.

For example, in response to receiving sensor information associated with a pressure from the second sensor 514 in a state in which bending of the electronic device 500 is sensed on the basis of the first sensor 512, the processor 520 may identify that a bending pressure has been sensed. For another example, in response to receiving the sensor information associated with the pressure from the second sensor 514 within a specific time after the bending of the electronic device 500 is sensed on the basis of the first sensor 512, the processor 520 may identify that the bending pressure has been sensed. For further example, in response to receiving the sensor information associated with the pressure from the second sensor 514 in a state in which the display 530 is inactivated, the processor 520 may identify that the bending pressure has been sensed.

According to an embodiment, in response to sensing a bending pressure on the basis of sensor information, the processor 520 may process to compensate sensor information associated with a pressure input that is sensed in a bending region. For example, the processor 520 may process to compensate the sensor information received from the second sensor 514 on the basis of the intensity of a bending pressure. For instance, the processor 520 may compensate the sensor information, wherein a pressure input sensed in a region where a bending pressure is provided is recognized as a pressure input sensed in conditions in which the bending pressure is not provided. For another example, the processor 520 may control the second sensor 514 wherein the sensor information is compensated by the second sensor 514. For instance, the processor 520 may receive the sensor information which is compensated on the basis of the bending pressure, from the second sensor 514.

According to an embodiment, the processor 520 may control a function of the electronic device 500 corresponding to the compensated sensor information. For example, the processor 520 may output, through the display 530, a function of the electronic device 500 controlled by the compensated sensor information.

In an embodiment, in response to a bending pressure equal to or greater than a reference input value being sensed, the processor 520 may process to control the display 530 wherein display information is displayed outside a bending region. For instance, that the bending pressure equal to or greater than the reference input value is sensed may be conditions in which an additional pressure input may not be sensed in the bending region because the bending pressure getting out of a range that the second sensor 514 may sense is provided. The processor 520 may process wherein the display information displayed in the bending region is displayed in a region capable of sensing the additional pressure input (e.g., a region where the bending pressure is not sensed).

According to an embodiment, the sensor 510 may consist of one of the first sensor 512 or the second sensor 514. For example, the first sensor 512 or the second sensor 514 may sense a bent state of the electronic device 500 and a pressure input for controlling an operation of the electronic device 500.

An electronic device according to various embodiments of the disclosure may include a sensor and a processor. The processor may be configured to sense bending of the electronic device through the sensor, sense a bending pressure provided by the bending of the electronic device through the sensor, and compensate the intensity of a pressure input sensed through the sensor on the basis of the intensity of the bending pressure.

According to an embodiment, the processor may be configured to control a function of the electronic device on the basis of the compensated intensity of the pressure input.

According to an embodiment, the processor may be configured to refine a reference variable for obtaining a pressure input in the sensor on the basis of the intensity of the bending pressure.

According to an embodiment, the processor may be configured to compensate the intensity of a pressure input sensed within a region corresponding to the bending pressure of the electronic device, on the basis of the intensity of the bending pressure.

According to an embodiment, the sensor may include a first sensor for sensing the bending or non-bending of the electronic device and a second sensor for obtaining the pressure input of the electronic device.

According to an embodiment, the processor may be configured to identify, as a bending pressure, a pressure sensed through the second sensor within a specific time after sensing bending of the electronic device by using the first sensor.

According to an embodiment, the processor may be configured to identify, as a bending pressure, a pressure sensed within a region corresponding to the bending pressure of the electronic device.

According to an embodiment, the electronic device may include a display, and the processor may be configured to identify, as a bending pressure, a pressure sensed through the second sensor while the display is in an inactive state.

According to an embodiment, the electronic device may include a display, and the processor may be configured to change an output position of display information outputted to the display on the basis of a bending region of the electronic device.

According to an embodiment, changing the output position of the display information on the basis of the bending region may include changing the output position of the display information outputted to the display through sensing of a bending pressure equal to or greater than a reference value.

Figure 6:
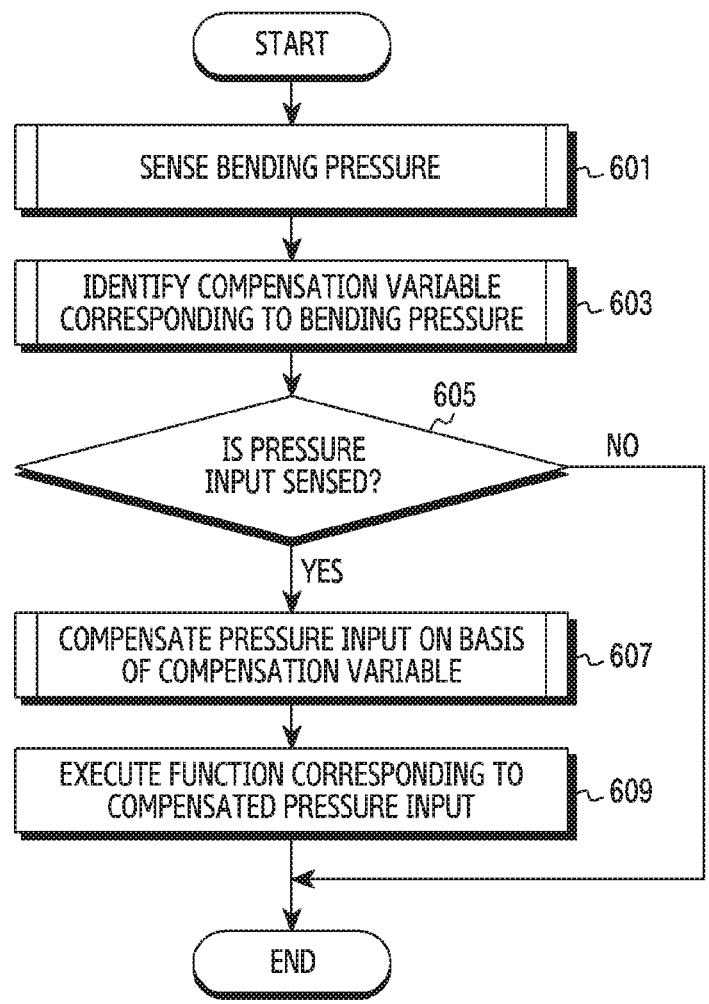
FIG. 6 is a flowchart illustrating an operation of processing a pressure input in the electronic device 500 according to various embodiments of the disclosure.

FIG. 6 is a flowchart illustrating an operation of processing a pressure input in the electronic device 500 according to various embodiments of the disclosure. And, FIG. 7A to FIG. 7D are example diagrams for explaining a pressure input compensation operation of the disclosure.

Referring to FIG. 6, in operation 601, the electronic device 500 may sense a bending pressure. For instance, the bending pressure may be an external pressure which is provided by bending that deforms a shape of the electronic device 500. For example, the electronic device 500 may identify a bending pressure which is applied to at least part of a sensor (e.g., the second sensor 514) capable of sensing a pressure input. For instance, the electronic device 500 may sense a bending pressure which is provided within a specific range with a criterion of a bending axis.

In operation 603, the electronic device 500 may identify a compensation variable corresponding to the bending pressure. For example, the compensation variable may be a value that is used for compensating a pressure input sensed in a bending region as a pressure input sensed in conditions in which the bending pressure is not provided. For instance, the compensation variable may include a compensation value applied to the pressure input and a sensed position of the pressure input to apply the compensation value.

In operation 605, the electronic device 500 may identify whether a pressure input is sensed in a state in which the bending pressure is sensed. For example, the electronic device 500 may identify whether an input (e.g., a user input) for controlling an operation of the electronic device 500 is sensed through the second sensor 514. For instance, the pressure input may include a pressure input by part of the user's body or a nonconductor.

Figure 7A:
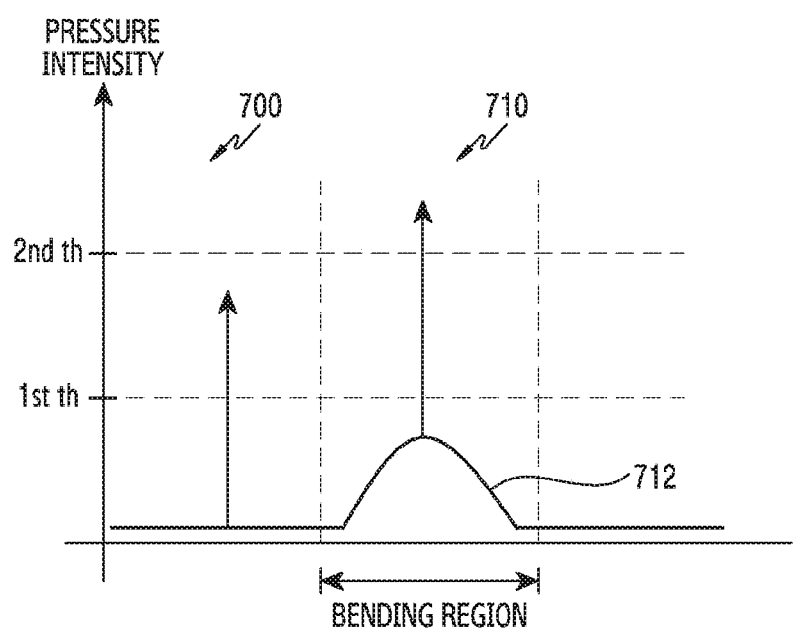
FIG. 7A to FIG. 7D are example diagrams for explaining a pressure input compensation operation of the disclosure.
Figure 7B:
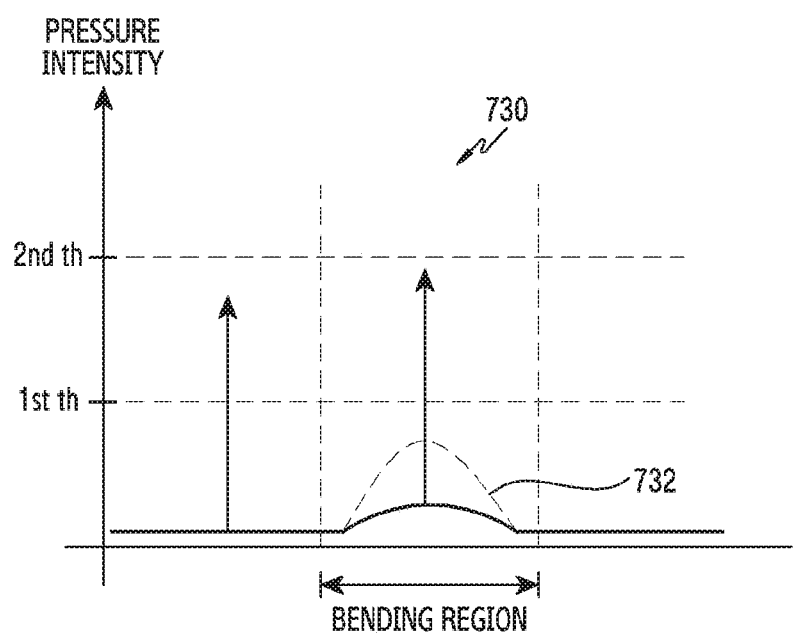
Figure 7C:
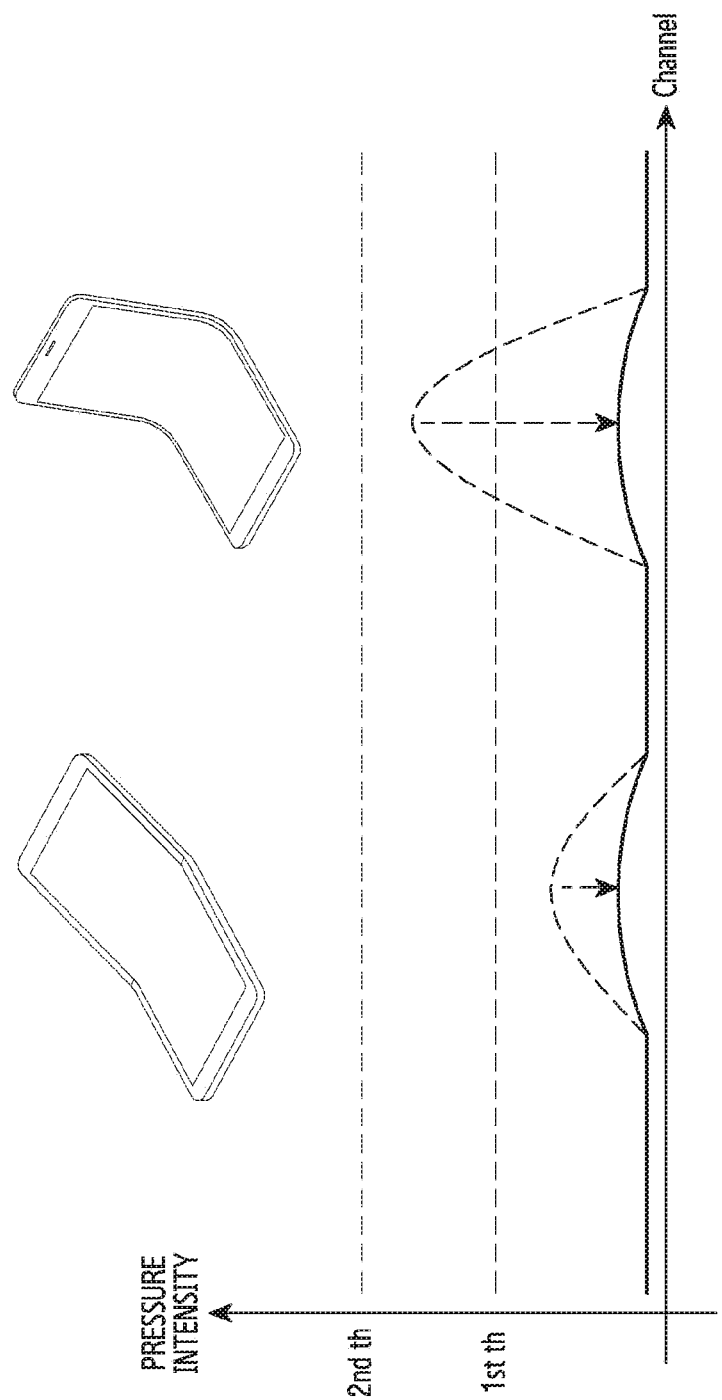
Figure 7D:
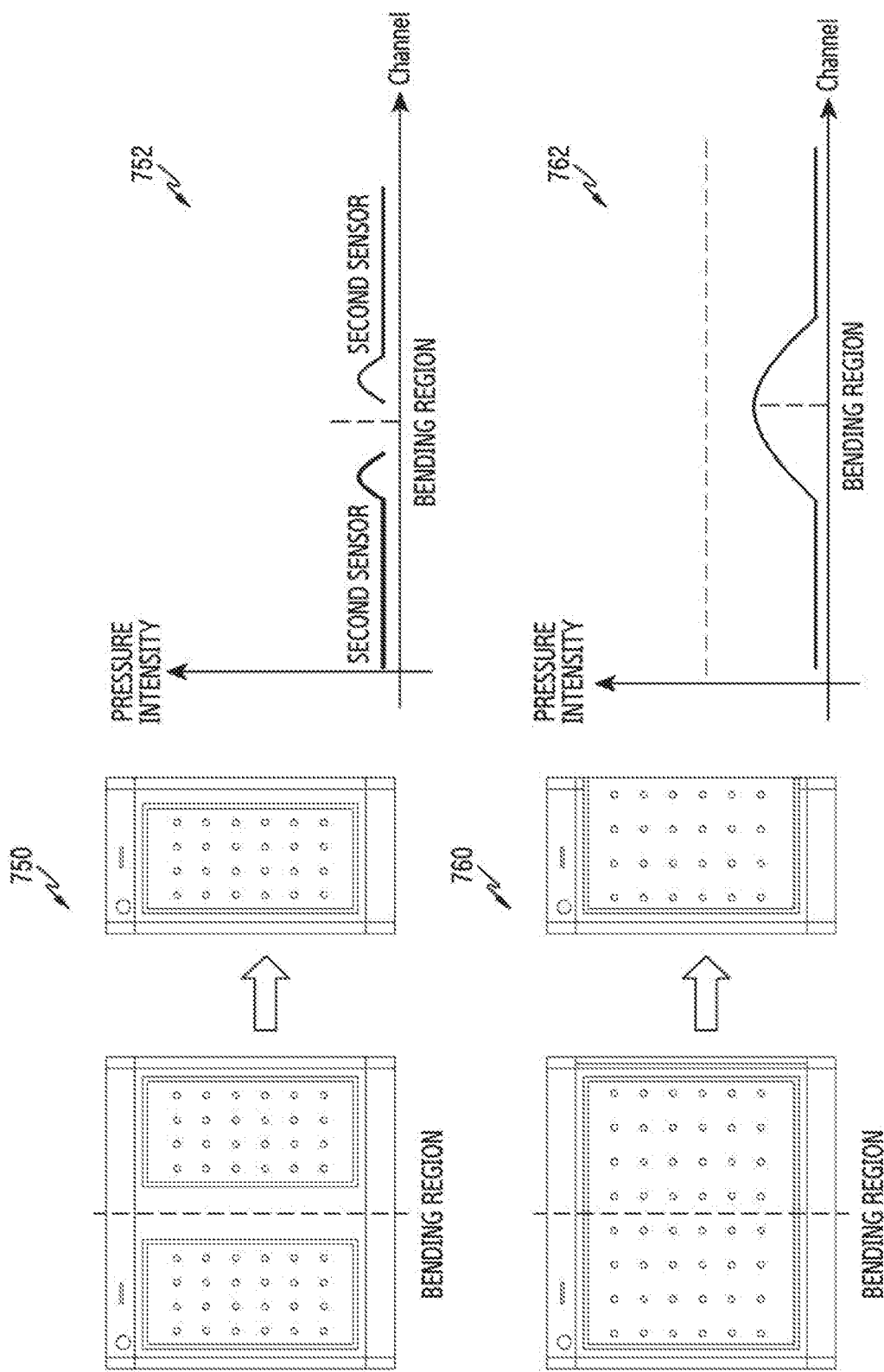

In response to the pressure input being sensed in the state in which the bending pressure is sensed, as in operation 607, the electronic device 500 may compensate the pressure input on the basis of the compensation variable. For example, in response to a sensed position of the pressure input corresponding to a compensation position, the electronic device 500 may compensate the pressure input by using a compensation value. For instance, as illustrated in FIG. 7A, to prevent a pressure intensity 700 corresponding to a first threshold value from being sensed as a pressure intensity 710 corresponding to a second threshold value due to an external pressure 712 in a bending region, the electronic device 500 may, as illustrated in FIG. 7B, compensate a pressure input by subtracting (732) the intensity of a bending pressure (or the given intensity of a pressure) from the sensed intensity of the pressure input. Also, as illustrated in FIG. 7C, the electronic device 500 may control a compensation value correspondingly to a bent state (e.g., a bending angle). For example, in a state in which the electronic device 500 is bent at a first angle, the electronic device 500 may compensate a pressure input on the basis of a first compensation value and, in response to the bending being changed into a second angle, the electronic device 500 may compensate a pressure input on the basis of a second compensation value. In response to a sensed position of the pressure input not corresponding to a compensation position, the electronic device 500 may not perform an operation of compensating the pressure input. Also, as in 750 of FIG. 7D, the bendable type electronic device 500 including at least two second sensors isolated on a per-bending-axis basis may compensate a pressure input of at least partial region 752 of the respective isolated second sensors corresponding to a bending region. For another example, as in 760 of FIG. 7D, the bendable type electronic device 500 including one second sensor unified on a per-bending-axis basis may compensate a pressure input of at least partial region 762 of the second sensor corresponding to a bending region.

In operation 609, the electronic device 500 may execute a function corresponding to the compensated pressure input. For example, a first-level pressure input that a user intends may be sensed as a second-level pressure input due to a bending pressure, but the electronic device 500 may compensate the pressure input, to execute a function corresponding to the first-level pressure input.

Figure 8:
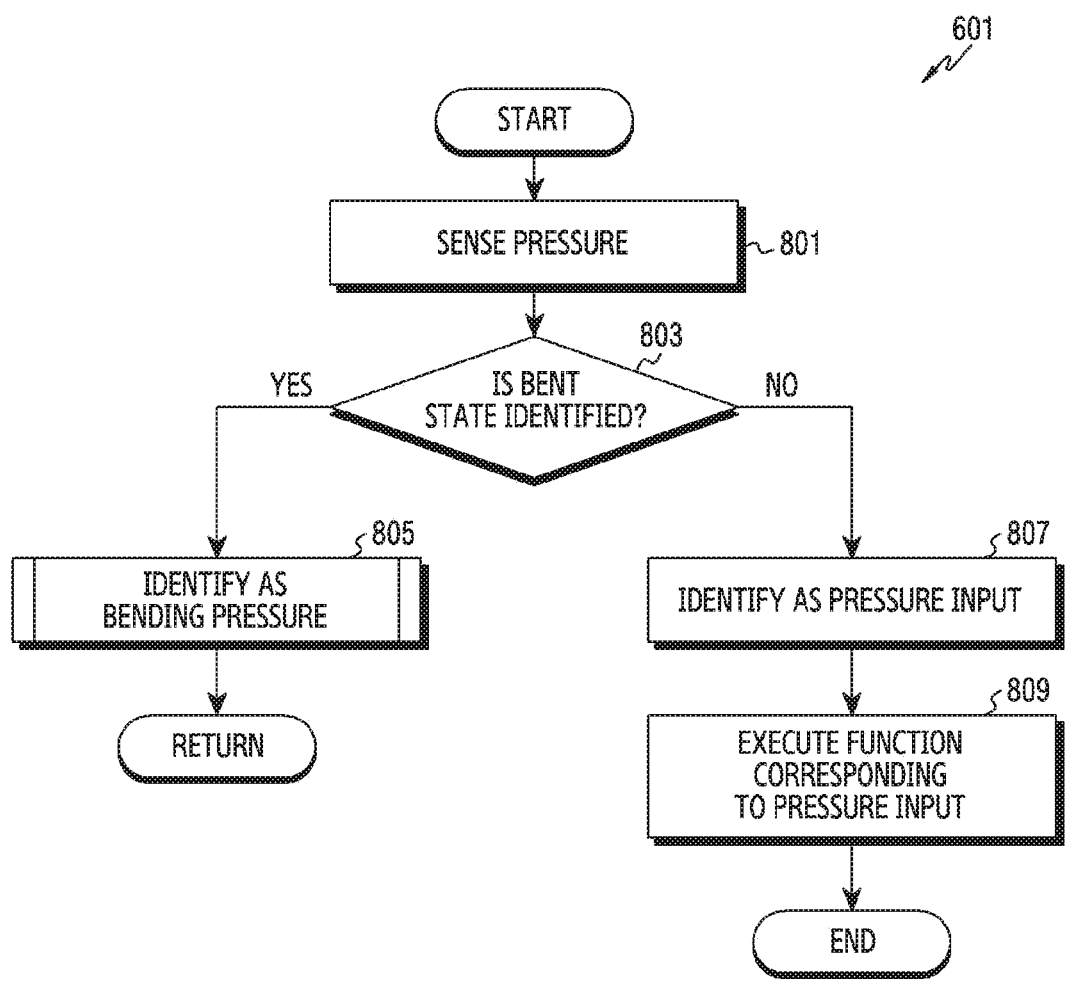
FIG. 8 is a flowchart illustrating an operation of sensing a bending pressure in the electronic device 500 according to various embodiments of the disclosure.

FIG. 8 is a flowchart illustrating an operation of sensing a bending pressure in the electronic device 500 according to various embodiments of the disclosure. According to various embodiments, the operation of sensing the bending pressure may be a detailed operation of operation 601 mentioned in FIG. 6.

Referring to FIG. 8, in operation 801, the electronic device 500 may sense a pressure on the basis of at least one second sensor 514 (e.g., a pressure sensor). For example, the electronic device 500 may sense the pressure through at least partial region (e.g., pixels) of the second sensor 514.

In operation 803, the electronic device 500 may identify whether a bent state of the electronic device 500 is sensed on the basis of at least one first sensor 512 (e.g., a bending sensor). For example, in response to sensor information associated with at least one of bending, rolling, folding, and twisting being collected by the first sensor 512, the electronic device 500 may identify that the bent state has been sensed.

In response to it being identified that the bent state has been sensed, in operation 805, the electronic device 500 may identify that the pressure sensed on the basis of the second sensor 514 is a bending pressure. For example, the electronic device 500 may identify that the pressure sensed in the bent state is not a pressure input intended by a user but an external pressure applied to at least part of the second sensor 514 due to bending of the electronic device 500. Also, in response to identifying that the sensed pressure is the bending pressure, the electronic device 500 may perform an operation of identifying a compensation variable corresponding to the bending pressure as well. For example, the electronic device 500 may perform an operation associated with operation 603 of FIG. 6.

In response to it being identified that a non-bent state has been sensed, in operation 807, the electronic device 500 may identify that the pressure sensed on the basis of the second sensor 514 is a pressure input. For example, the electronic device 500 may identify that the pressure sensed in the bent state is a pressure input by part of the body or a nonconductor, which a user intends. Also, in operation 809, the electronic device 500 may execute a function corresponding to the pressure input. For example, the electronic device 500 may identify the intensity of the pressure input, and execute a function corresponding to the intensity of the pressure input.

Figure 9:
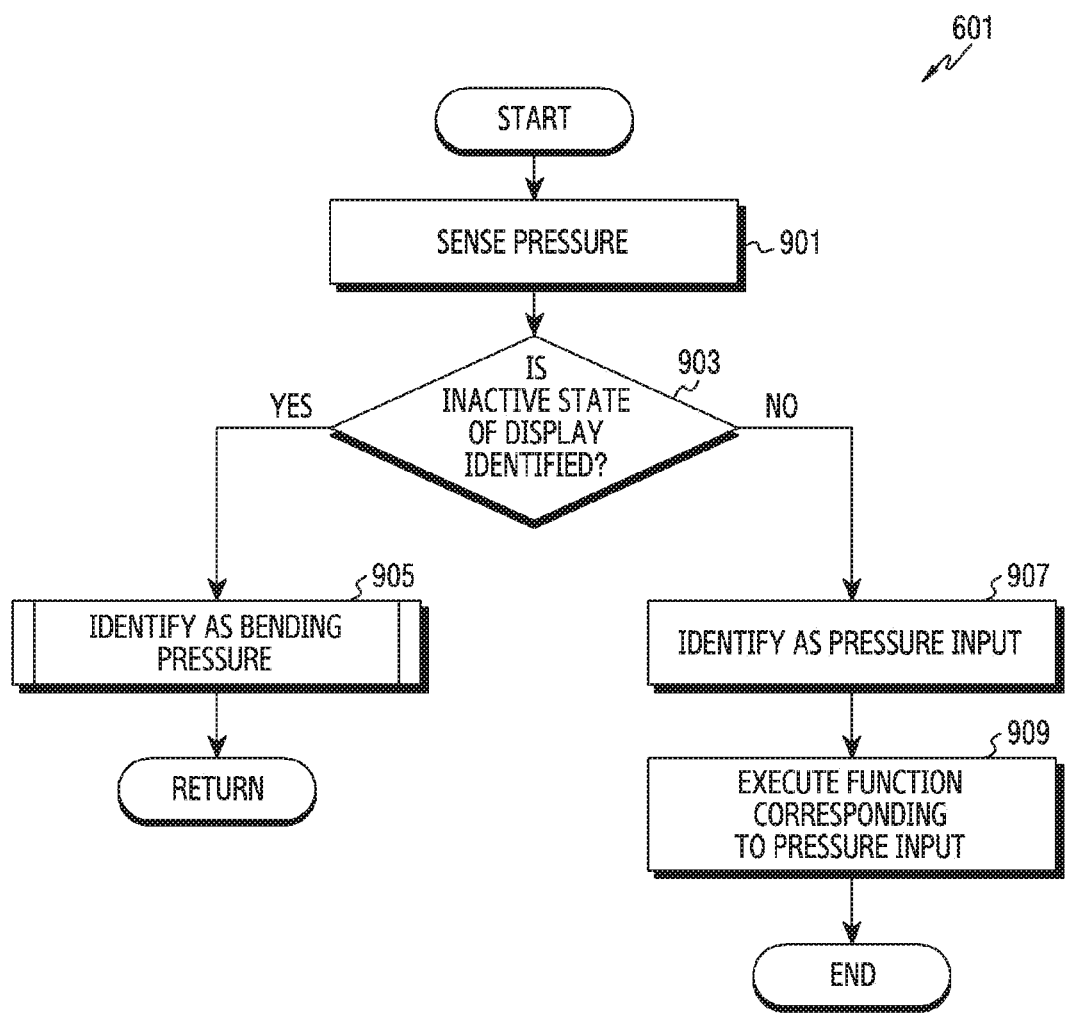
FIG. 9 is a flowchart illustrating another operation of sensing a bending pressure in an electronic device according to various embodiments of the disclosure.

FIG. 9 is a flowchart illustrating another operation of sensing a bending pressure in the electronic device 500 according to various embodiments of the disclosure. According to various embodiments, the operation of sensing the bending pressure may be a detailed operation of operation 601 mentioned in FIG. 6.

Referring to FIG. 9, in operation 901, the electronic device 500 may sense a pressure on the basis of at least one second sensor 514 (e.g., a pressure sensor). For example, the electronic device 500 may sense the pressure through at least partial region (e.g., pixels) of the second sensor 514.

In operation 903, the electronic device 500 may identify whether the display 530 is in an inactive state. For example, the inactive state of the display 530 may include a power off state of the display 530 or a state in which the display 530 operates in a predefined scheme (e.g., a scheme of decreasing a resolution, a scheme of decreasing a screen brightness, etc.).

In response to identifying the inactive state of the display 530, in operation 905, the electronic device 500 may identify that the pressure sensed on the basis of the second sensor 514 is a bending pressure. For example, the electronic device 500 may identify that the pressure sensed in the inactive state of the display 530 is not a pressure input that a user intends but an external pressure applied to at least part of the second sensor 514 due to bending of the electronic device 500. Also, in response to identifying that the sensed pressure is the bending pressure, the electronic device 500 may perform an operation of identifying a compensation variable corresponding to the bending pressure as well. For example, the electronic device 500 may perform an operation associated with operation 603 of FIG. 6.

In response to identifying an active state of the display 530, in operation 907, the electronic device 500 may identify that the pressure sensed on the basis of the second sensor 514 is a pressure input. For example, the electronic device 500 may identify that the pressure sensed in the active state of the display 530 is a pressure input by part of the body or a nonconductor, which a user intends. Also, in operation 909, the electronic device 500 may execute a function corresponding to the pressure input. For example, the electronic device 500 may identify the intensity of the pressure input, and execute a function corresponding to the intensity of the pressure input.

Figure 10:
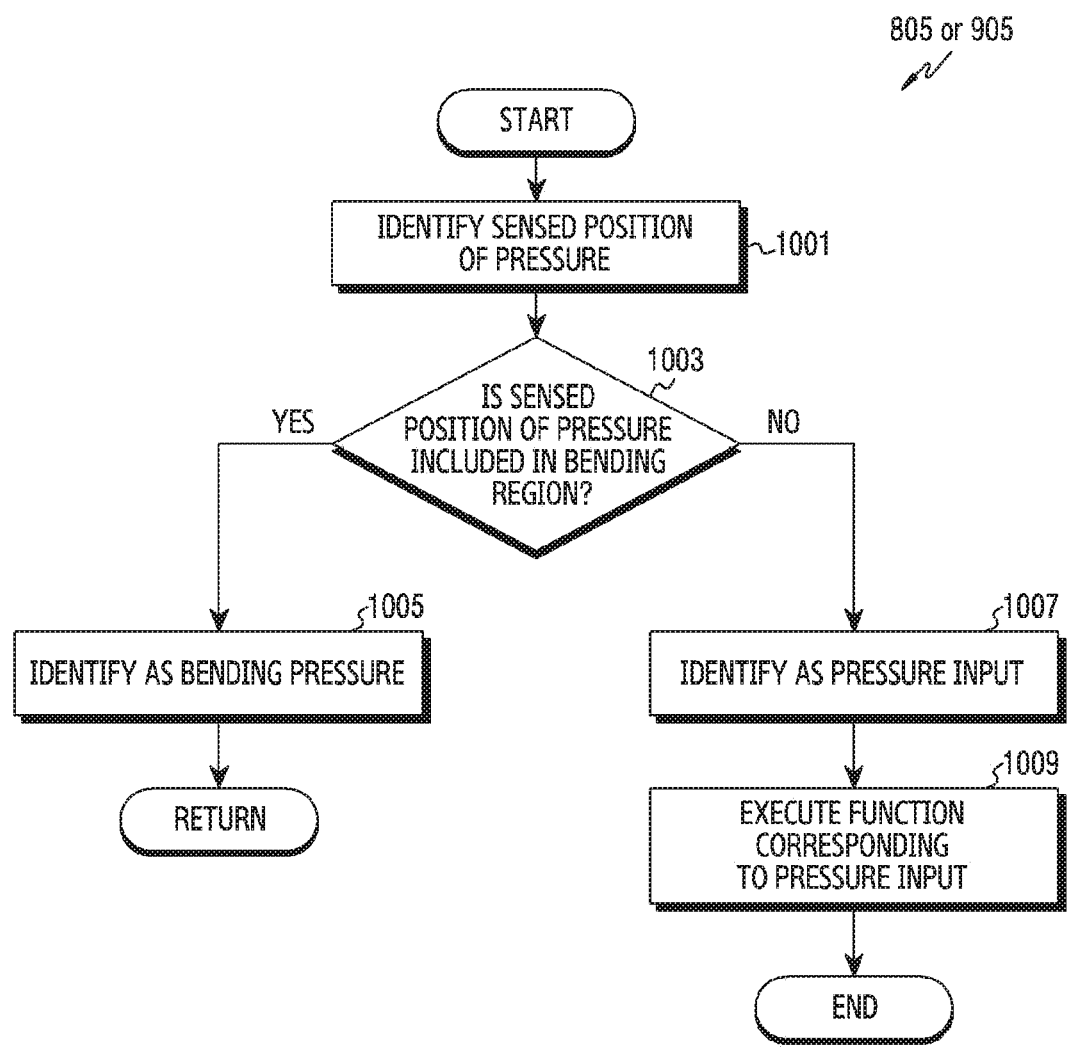
FIG. 10 is a flowchart illustrating an operation of identifying a bending pressure in an electronic device according to various embodiments of the disclosure.

FIG. 10 is a flowchart illustrating an operation of identifying a bending pressure in the electronic device 500 according to various embodiments of the disclosure. According to various embodiments, the operation of identifying the bending pressure may be a detailed operation of operation 805 mentioned in FIG. 8. Also, the operation of identifying the bending pressure may be a detailed operation of operation 905 mentioned in FIG. 9 as well.

Referring to FIG. 10, in operation 1001, the electronic device 500 may identify a sensed position of a pressure input on the basis of at least one second sensor 514 (e.g., a pressure sensor). For example, the electronic device 500 may identify that a position of a pixel of the second sensor 514 sensing a pressure (or the pressure input) is the sensed position of the pressure input.

In operation 1003, the electronic device 500 may identify whether the sensed position of the pressure input is included in a bending region. For example, the electronic device 500 may identify a reference axis at which bending is provided on the basis of the first sensor 512, and may define a specific region as the bending region with a criterion of the identified reference axis. For instance, the electronic device 500 may identify whether the pressure input has been sensed through at least part of the second sensor 514 included in the bending region.

In response to the pressure sensed position being included in the bending region, in operation 1005, the electronic device 500 may identify that a pressure sensed on the basis of the second sensor 514 is a bending pressure. Also, in response to identifying that the sensed pressure is the bending pressure, the electronic device 500 may perform an operation of identifying a compensation variable corresponding to the bending pressure as well. For example, the electronic device 500 may perform an operation associated with operation 603 of FIG. 6.

In response to the pressure sensed position not being included in the bending region, in operation 1007, the electronic device 500 may identify that the pressure sensed on the basis of the second sensor 514 is a pressure input. For example, the electronic device 500 may identify that a pressure input by part of the body or a nonconductor, which a user intends, has been sensed. Also, in operation 1009, the electronic device 500 may execute a function corresponding to the pressure input. For example, the electronic device 500 may identify the intensity of the pressure input, and execute a function corresponding to the intensity of the pressure input.

Figure 11:
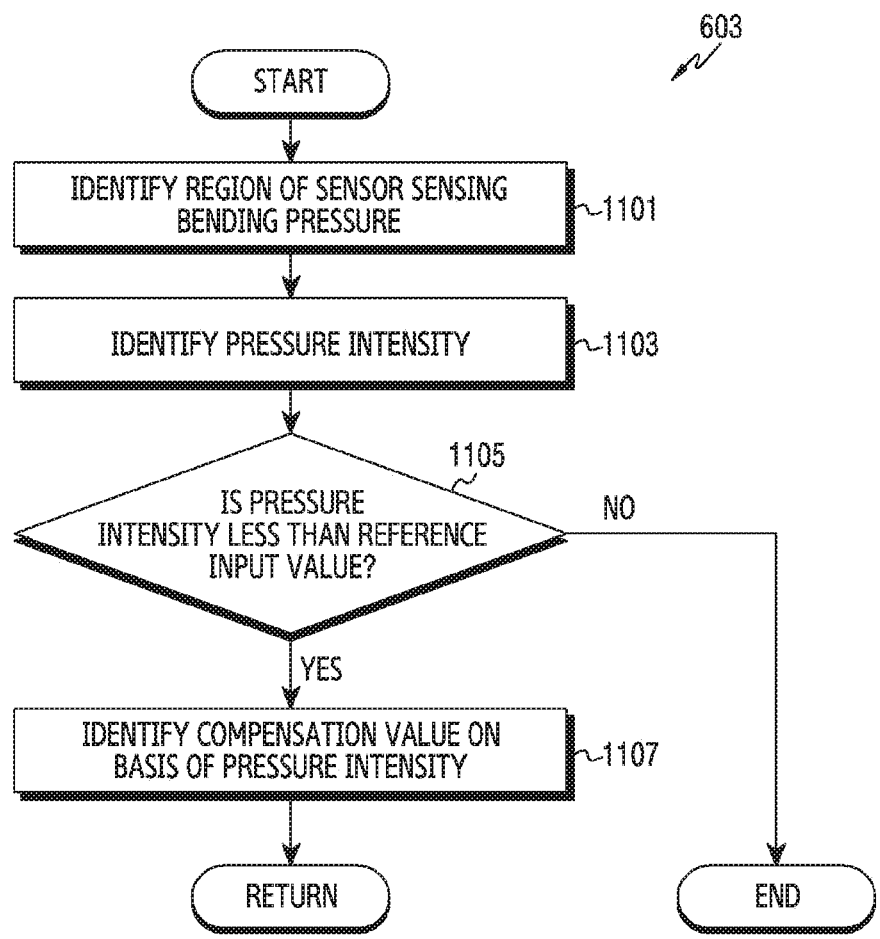
FIG. 11 is a flowchart illustrating an operation of identifying a compensation variable for a pressure input in an electronic device according to various embodiments of the disclosure.

FIG. 11 is a flowchart illustrating an operation of identifying a compensation variable for a pressure input in the electronic device 500 according to various embodiments of the disclosure. According to various embodiments, the operation of identifying the compensation variable for the pressure input may be a detailed operation of operation 603 mentioned in FIG. 6.

Referring to FIG. 11, in operation 1101, the electronic device 500 may identify a region of a sensor sensing a bending pressure. For example, the electronic device 500 may identify at least some pixels sensing the bending pressure among pixels (e.g., the entire pixels) included in the second sensor 514. The electronic device 500 may identify that the region of the sensor sensing the bending pressure is a bending region.

In operation 1103, the electronic device 500 may identify the intensity of the pressure (e.g., the bending pressure) sensed on the basis of the second sensor 514.

In operation 1105, the electronic device 500 may identify whether a pressure intensity less than a reference input value has been identified. For example, the reference input value may be a reference value for identifying conditions capable of sensing a pressure input. For instance, the electronic device 500 may use a pressure intensity of a range that the second sensor 514 may sense, as the reference input value. Also, in response to a pressure intensity equal to or greater than the reference input value being identified, the electronic device 500 may identify that the intensity of an additional pressure input may not be sensed in the bending region due to the bending pressure.

In response to the pressure intensity less than the reference input value being identified, in operation 1107, the electronic device 500 may identify a compensation value on the basis of the pressure (e.g., bending pressure) intensity.

For example, the electronic device 500 may identify the intensity of the bending pressure as the compensation value. For instance, the intensity of the bending pressure may be an average value of the intensities of pressures measured in respective pixels, or the greatest intensity of a pressure among the intensities of the pressures measured in the respective pixels as well. Also, in response to identifying the compensation value on the basis of the pressure intensity, the electronic device 500 may perform an operation of sensing a pressure input. For example, the electronic device 500 may perform an operation associated with operation 605 of FIG. 6.

In response to the pressure intensity equal to or greater than the reference input value being identified, the electronic device 500 determines that a pressure input may not be measured in a state in which a bending pressure is sensed, and thus may not perform an operation of compensating the pressure input. For another example, in response to identifying that an additional pressure input may not be measured in the state in which the bending pressure is sensed, the electronic device 500 may process wherein display information displayed in a bending region is displayed outside the bending region.

Figure 12:
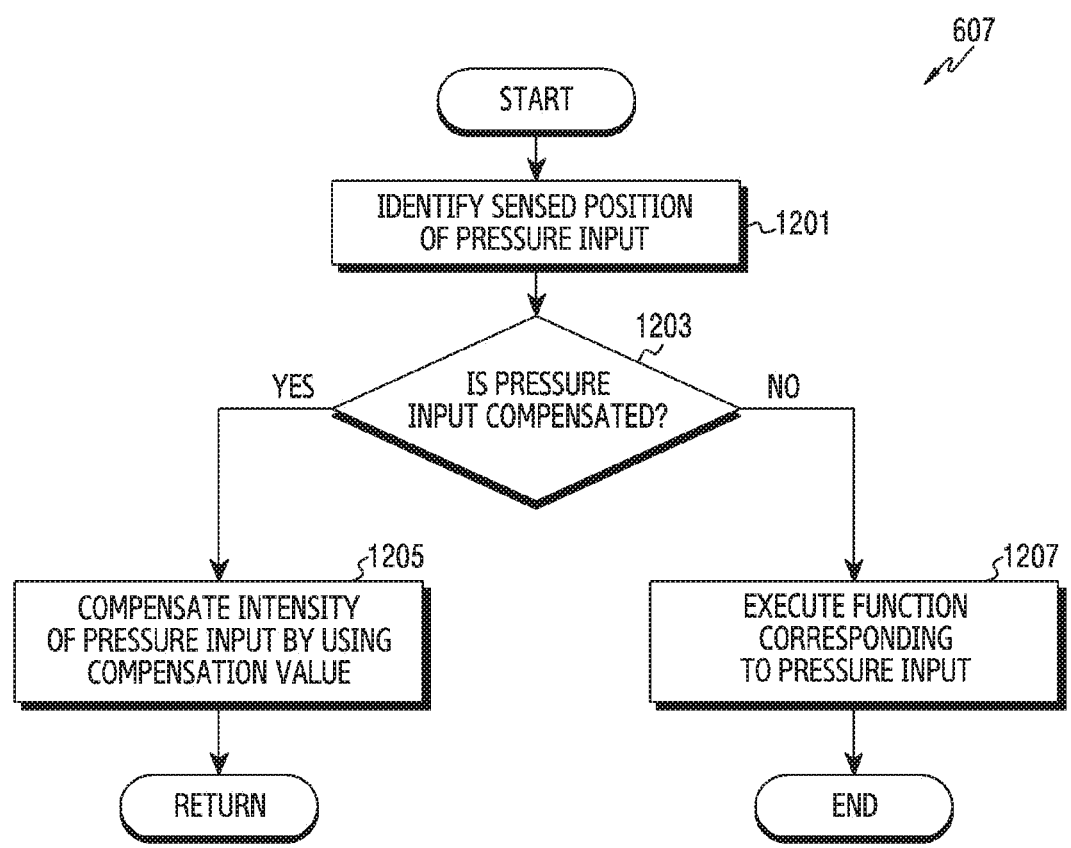
FIG. 12 is a flowchart illustrating an operation of compensating a pressure input in an electronic device according to various embodiments of the disclosure.

FIG. 12 is a flowchart illustrating an operation of compensating a pressure input in the electronic device 500 according to various embodiments of the disclosure. According to various embodiments, the operation of compensating the pressure input may be a detailed operation of operation 607 mentioned in FIG. 6.

Referring to FIG. 12, in operation 1201, the electronic device 500 may identify a sensed position of a pressure input. For example, the electronic device 500 may identify that a position of a pixel of the second sensor 514 sensing a pressure (or the pressure input) is a sensed position of the pressure input.

In operation 1203, the electronic device 500 may identify whether it is conditions to compensate the pressure input on the basis of the sensed position of the pressure input. For example, in response to sensing the pressure input in a position corresponding to a compensation position, the electronic device 500 may identify that it is conditions of compensating the pressure input. For instance, the compensation position may be at least part of a region in which a bending pressure is provided. Also, in response to sensing a pressure input in a position not corresponding to the compensation position, the electronic device 500 may identify that it is not conditions of compensating the pressure input.

In response to identifying that it is the conditions of compensating the pressure input, in operation 1205, the electronic device 500 may compensate the pressure input (e.g., an input intensity) by using a compensation value. For example, the electronic device 500 may compensate the intensity of the pressure input by subtracting the compensation value from sensor information collected from the second sensor 514. Also, in response to compensating the intensity of the pressure input, the electronic device 500 may execute a function corresponding to the compensated pressure input. For example, the electronic device 500 may perform an operation associated with operation 609 of FIG. 6.

Also, in response to identifying that it is not the conditions of compensating the pressure input, in operation 1207, the electronic device 500 may execute a function corresponding to the pressure input. For example, the electronic device 500 may execute a function of the electronic device 500 on the basis of the sensor information collected from the second sensor 514.

Figure 13:
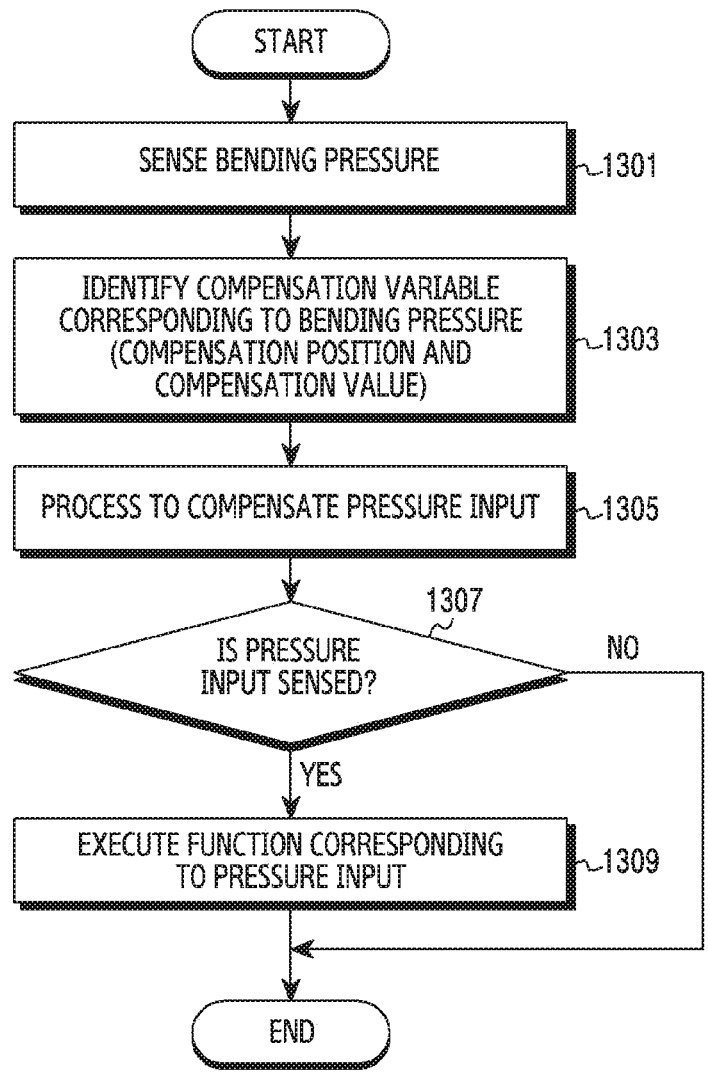
FIG. 13 is a flowchart illustrating another operation of processing a pressure input in the electronic device 500 according to various embodiments of the disclosure.

FIG. 13 is a flowchart illustrating another operation of processing a pressure input in the electronic device 500 according to various embodiments of the disclosure.

Referring to FIG. 13, in operation 1301, the electronic device 500 may sense a bending pressure. For instance, the bending pressure may be an external pressure which is provided by bending that deforms a shape of the electronic device 500. For example, the electronic device 500 may identify the bending pressure which is applied to at least part of a sensor (e.g., the second sensor 514) capable of sensing a pressure input. For instance, the electronic device 500 may sense the bending pressure which is provided within a specific range with a criterion of a bending axis.

In operation 1303, the electronic device 500 may identify a compensation variable corresponding to the bending pressure. For example, the compensation variable may be a value that is used for compensating a pressure input sensed in a bending region as a pressure input sensed in conditions in which the bending pressure is not provided. For instance, the compensation variable may include a compensation value applied to a pressure input and a sensed position of the pressure input to apply the compensation value.

In operation 1305, the electronic device 500 may process wherein the pressure input is compensated on the basis of the compensation variable. For example, the electronic device 500 may process to control the second sensor 514 sensing the pressure input, wherein the pressure input is compensated. For instance, the electronic device 500 may process wherein an obtaining sensitivity of the second sensor 514 is controlled on the basis of the compensation variable.

In operation 1307, the electronic device 500 may identify whether a pressure input is sensed. For example, the electronic device 500 may identify whether sensor information on the pressure input compensated by the second sensor 514 is provided to the processor 520.

In response to the pressure input being sensed, in operation 1309, the electronic device 500 may execute a function corresponding to the pressure input. For example, the electronic device 500 may execute a function of the electronic device 500 on the basis of the pressure input compensated by the second sensor 514.

Figure 14:
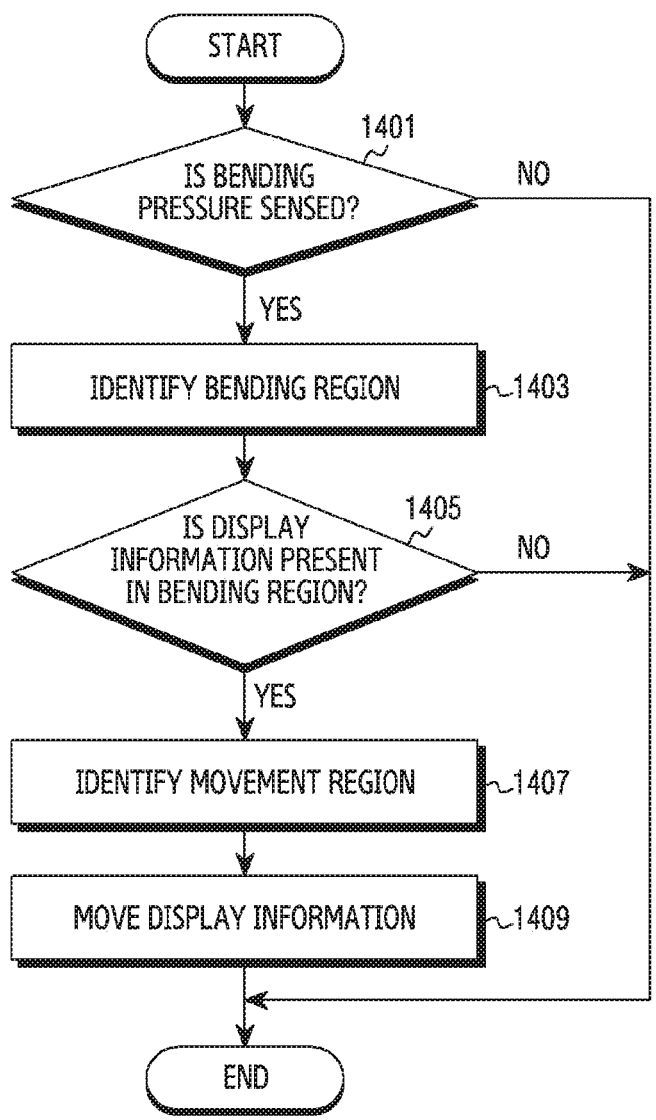
FIG. 14 is a flowchart illustrating a further operation of processing a pressure input in the electronic device 500 according to various embodiments of the disclosure.
Figure 15:
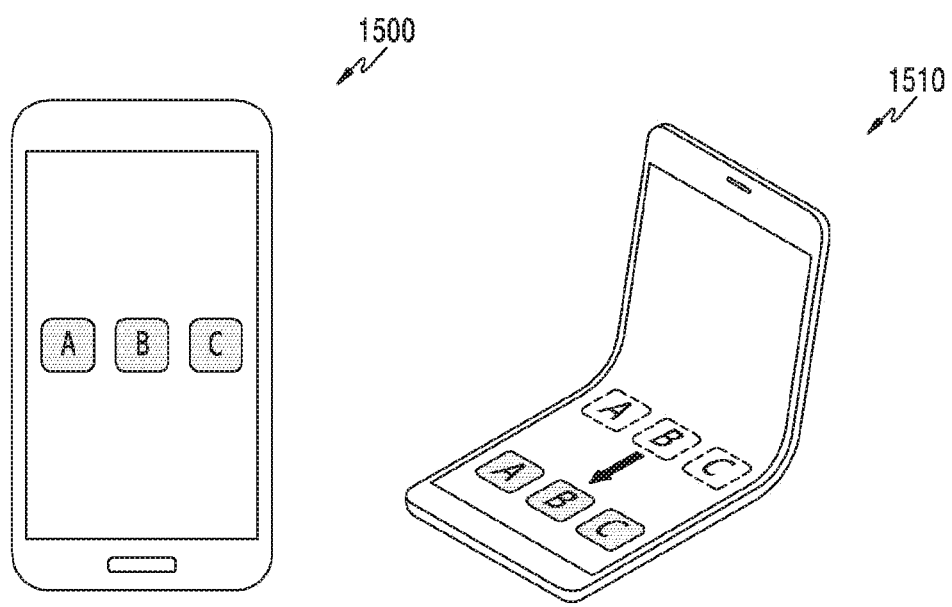
FIG. 15 is an example diagram for explaining a display information movement operation of the disclosure.

FIG. 14 is a flowchart illustrating a further operation of processing a pressure input in the electronic device 500 according to various embodiments of the disclosure. And, FIG. 15 is an example diagram for explaining a display information movement operation of the disclosure.

In operation 1401, the electronic device 500 may identify whether a bending pressure is sensed. For instance, the bending pressure may be an external pressure which is provided by bending that deforms a shape of the electronic device 500. For example, the electronic device 500 may identify a bending pressure which is applied to at least part of a sensor (e.g., the second sensor) capable of sensing a pressure input.

In response to identifying that the bending pressure has been sensed, in operation 1403, the electronic device 500 may identify a bending region. For example, the electronic device 500 may identify, as the bending region, at least some pixels sensing the bending pressure among pixels (e.g., the entire pixels) included in the second sensor 514.

In operation 1405, the electronic device 500 may identify whether display information is present in the bending region. For example, the electronic device 500 may identify whether at least one display information is present in a display region corresponding to the bending region. For instance, the display information may include at least one of display information of an icon form, display information of a window form, display information of a text form, and/or display information of a pop-up form.

In response to identifying that the display information is present in the bending region, in operation 1407, the electronic device 500 may identify a movement region for the display information. For example, the electronic device 500 may identify a movement region or a movement range, wherein the display information gets out of the bending region.

As in operation 1409, the electronic device 500 may move the display information on the basis of the movement region. For example, as illustrated in FIG. 15, in response to sensing bending in a state (1500) of outputting at least one display information, the electronic device 500 may display (1510) the display information present in the bending region (e.g., a center of a screen), in a region (e.g., a lower end of the screen) where a bending pressure is not provided. For instance, the electronic device 500 may additionally generate one screen (e.g., a pop-up screen) consisting of the display information being present in the bending region, and display the generated one screen in the region where the bending pressure is not provided. Also, by changing an array of the display information displayed on the screen with a criterion of the bending region, the electronic device 500 may display the display information present in the bending region, in the region where the bending pressure is not provided. Also, by splitting one screen into at least two screens (e.g., windows) with a criterion of the bending region, the electronic device 500 may display the display information present in the bending region, in the region where the bending pressure is not provided.

An operation method of an electronic device according to various embodiments of the disclosure may include sensing bending of the electronic device through a sensor, sensing a bending pressure provided by the bending of the electronic device through the sensor, and compensating the intensity of a pressure input sensed through the sensor on the basis of the intensity of the bending pressure.

According to an embodiment, the operation method of the electronic device may further include controlling a function of the electronic device on the basis of the compensated intensity of the pressure input.

According to an embodiment, compensating the intensity of the pressure input sensed through the sensor may include refining a reference variable for obtaining a pressure input in the sensor on the basis of the intensity of the bending pressure.

According to an embodiment, compensating the intensity of the pressure input sensed through the sensor may include compensating the intensity of the pressure input sensed within a region corresponding to the bending pressure of the electronic device, on the basis of the intensity of the bending pressure.

According to an embodiment, the operation method of the electronic device may include acquiring sensor information through a first sensor for sensing the bending or non-bending of the electronic device and a second sensor for obtaining the pressure input of the electronic device.

According to an embodiment, sensing the bending pressure may include identifying, as a bending pressure, a pressure sensed through the second sensor after sensing bending of the electronic device by using the first sensor.

According to an embodiment, sensing the bending pressure may include identifying, as a bending pressure, a pressure sensed within a region corresponding to the bending pressure of the electronic device.

According to an embodiment, sensing the bending pressure may include identifying, as a bending pressure, a pressure sensed through the second sensor while a display is in an inactive state.

According to an embodiment, the operation method of the electronic device may further include changing an output position of display information outputted to the display on the basis of a bending region of the electronic device.

According to an embodiment, changing the output position of the display information on the basis of the bending region may include changing the output position of the display information through sensing of a bending pressure equal to or greater than a reference value.

And, an embodiment disclosed in the document is to be suggested for explaining and understanding of the technology content disclosed, and does not limit the scope of various embodiments of the disclosure. Accordingly, the scope of the various embodiments of the disclosure should be construed as including all modifications or various other embodiments that are based on the technological spirit of the various embodiments of the disclosure.

What is claimed is:

1. An electronic device comprising:
   at least one sensor; and
   at least one processor electrically coupled with the at least one sensor,
   wherein the at least one processor is configured to:
   obtain a pressure input through the at least one sensor; and
   in response to the pressure input being sensed in a state in which bending of the electronic device is provided, compensate the intensity of the pressure input on the basis of the intensity of a bending pressure.

2. The electronic device of claim 1, wherein the at least one processor is configured to control a function of the electronic device on the basis of the compensated intensity of the pressure input.

3. The electronic device of claim 1, wherein the at least one processor is configured to, in response to obtaining the state in which the bending of the electronic device is provided, control an obtaining sensitivity of the at least one sensor.

4. The electronic device of claim 1, wherein the at least one sensor comprises a first sensor for sensing the bending and a second sensor for obtaining the pressure input.

5. The electronic device of claim 4, wherein the at least one processor is configured to:
   acquire first information through the first sensor; and
   in response to acquiring second information through the second sensor within a specific time after acquiring the first information, identify that it is the state in which the bending of the electronic device is provided.

6. The electronic device of claim 4, comprising a display, wherein the at least one processor is configured to, in response to an input being sensed through the second sensor while the display is in an inactive state, identify that it is the state in which the bending of the electronic device is provided.

7. The electronic device of claim 1, comprising a display, wherein the at least one processor is configured to change an output position of display information outputted to the display on the basis of a bending region of the electronic device.

8. The electronic device of claim 7, wherein the at least one processor is configured to, in response to a pressure input equal to or greater than a given reference intensity being sensed, change an output position of display information outputted to a region where the pressure input is sensed.

9. An operation method of an electronic device, comprising:
obtaining a pressure input through at least one sensor; and
in response to the pressure input being sensed in a state in which bending of the electronic device is provided, compensating the intensity of the pressure input on the basis of the intensity of a bending pressure.

10. The method of claim 9, comprising controlling a function of the electronic device on the basis of the compensated intensity of the pressure input.

11. The method of claim 9, comprising, in response to obtaining the state in which the bending of the electronic device is provided, controlling an obtaining sensitivity of the at least one sensor.

12. The method of claim 9, comprising:
sensing the bending using a first sensor; and
sensing the pressure input using a second sensor.

13. The method of claim 12, comprising:
acquiring first information through the first sensor; and
in response to acquiring second information through the second sensor within a specific time after acquiring the first information, identifying that it is the state in which the bending of the electronic device is provided.

14. The method of claim 12, comprising, in response to an input being sensed through the second sensor while a display of the electronic device is in an inactive state, identifying that it is the state in which the bending of the electronic device is provided.

15. The method of claim 12, comprising, in response to the pressure input sensed position being included in the bending sensed position, identify that it is the state in which the bending of the electronic device is provided.

16. The method of claim 11, comprising changing a position of display information outputted to a display on the basis of a bending region of the electronic device.

17. The method of claim 16, comprising, in response to a pressure input equal to or greater than a given reference intensity being sensed, changing a position of display information outputted to a region where the pressure input is sensed.

18. The electronic device of claim 1, wherein the at least one processor is configured to compensate the pressure input sensed in a bending region on the basis of the intensity of a bending pressure.

19. The electronic device of claim 4, wherein the at least one processor is configured to, in response to the pressure input sensed position being included in the bending sensed position, identify that it is the state in which the bending of the electronic device is provided.

20. The method of claim 9, wherein compensating the intensity of the pressure input comprising:
compensating the pressure input sensed in a bending region on the basis of the intensity of a bending pressure.

* * * * *